UNITED STATES PATENT OFFICE.

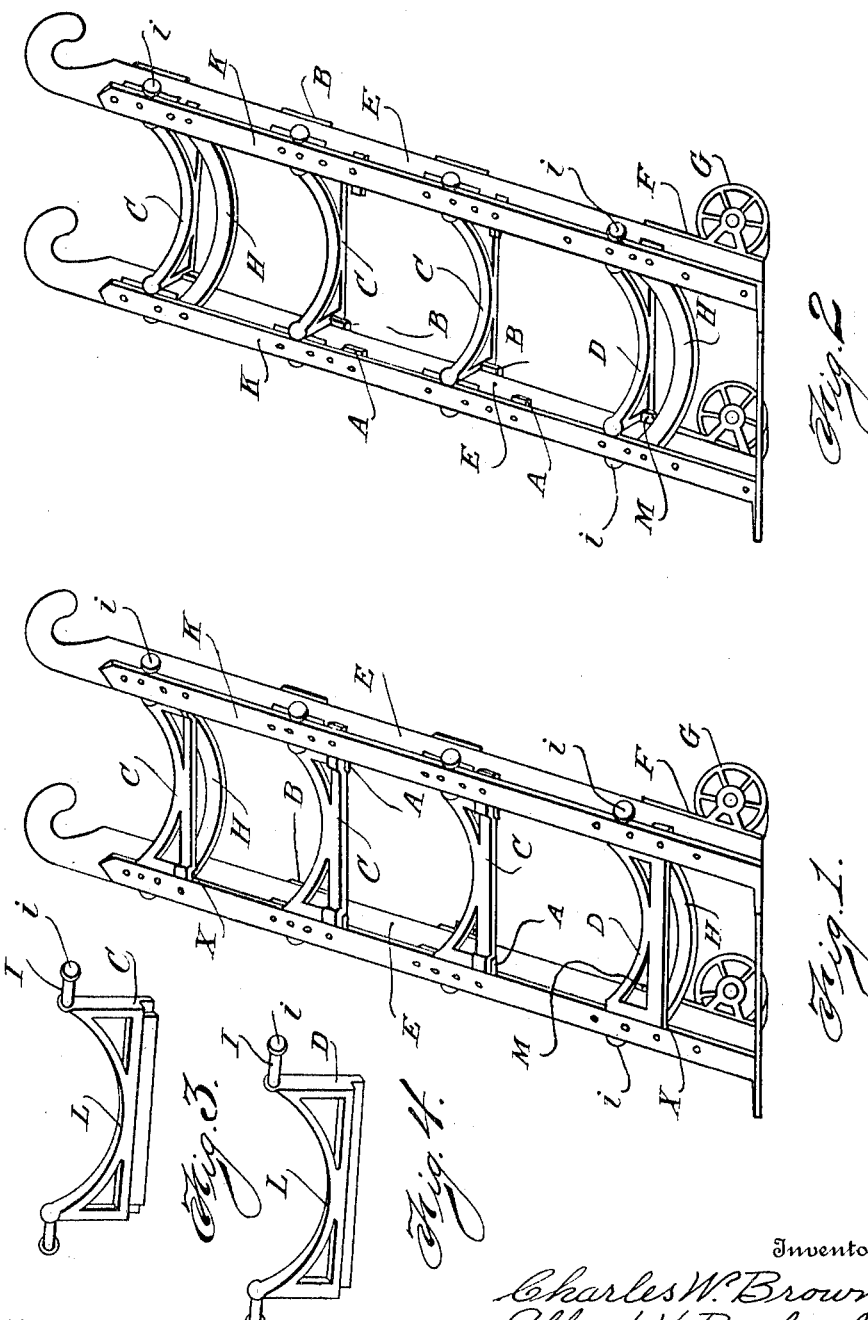

CHARLES W. BROWN, OF CLEVELAND, AND ALFRED H. BOWLZER, JR., OF LAKEWOOD, OHIO.

CONVERTIBLE HAND-TRUCK.

1,114,853.  Specification of Letters Patent.  Patented Oct. 27, 1914.

Application filed November 21, 1913. Serial No. 802,245.

*To all whom it may concern:*

Be it known that we, CHARLES W. BROWN and ALFRED H. BOWLZER, Jr., citizens of the United States, residing at Cleveland and Lakewood, respectively, in the county of Cuyahoga and State of Ohio, have invented certain new and useful Improvements in Convertible Hand-Trucks, of which the following is a specification.

This invention is a convertible hand truck, designed for carrying either barrels or boxes and similar flat sided articles, and it embodies a truck frame provided with cross bars which may be adjusted to present either a concave surface for barrel use or a flat surface for use with boxes, said cross bars being pivotally mounted in the side bars of the frame so that they may be swung to either of the two positions.

The invention is illustrated in the accompanying drawings in which—

Figure 1 is a perspective view of the truck with the cross bars adjusted for carrying boxes. Fig. 2 is a similar view with the bars adjusted for carrying barrels. Figs. 3 and 4 are details of two of the cross bars.

Referring specifically to the drawings, the truck frame includes the side bars E provided with handles as usual and the bearing brackets F which carry the usual wheels G. These side bars are connected by upper and lower fixed or stationary cross bars H which are concave or curved to approximately the shape of a barrel. The rotary bars C and D are also mounted between the side bars. In the truck illustrated there are three bars C and a lower bar D, the latter being slightly different in shape from the former, although capable of adjustment in practically the same way. These bars C and D have trunnions I at opposite ends which are set in bearings under straps K, which are laid along the front edge of the side bars E. Each of the bars C and D has a flat side which is presented at the front for box use, and a curved or concave edge L which is presented at the front when the bars are adjusted for barrel use. The body of the bars C and D may be swung up or down between the side bars E to convert the truck. In one position the intermediate bars C rest on lugs A fastened to the side bars E under the straps K, and the upper bar C and the lower bar D rest on the fixed bars H at the points X, as shown in Fig. 1. In this position of the cross bars a flat top surface is presented suitable for carrying boxes and similar packages. To convert the truck for barrel use, the bars C are swung around between the side bars E until they stop against lugs B which are fastened to the underside of the side bars E, and the bar D is swung over and down against the lugs M which project from the bracket F which support the wheels. In this position the concave edges or surfaces L of the cross bars are presented in proper position to carry a barrel or other curved package.

It requires but a minute to swing the cross bars over to either position, according to the work at hand. The trunnions I of the cross bars are preferably provided with heads *i* which are located outside the bearings so that they assist in preventing spreading of the side bars. Therefore the stationary bars H could be omitted if desired, stop lugs being substituted. Various other modifications might be made within the scope of the invention.

Having thus described our invention, what we claim as new and desire to secure by Letters Patent is:

1. A convertible truck having side bars, pivoted cross bars therebetween, said cross bars being pivoted at their ends to the side bars and having a flat side and a concave edge and adapted to be swung to present either said side or said edge for use, and stops on the side bars, adapted to support the cross bars in either position.

2. A convertible truck having side bars with bearings therein, cross bars having a flat side and a concave edge, and provided with trunnions fitting in said bearings, whereby they may be turned to present either of said side or said edge to position for use, and stops projecting from said side bars, to support the cross bars in either position, the trunnions being located at the ends of said concave edge, whereby the cross bars will hang down between the side bars when said concave edges are presented for use.

3. A convertible truck having side bars, fixed cross bars therebetween, and pivoted cross bars between the side bars, said pivoted cross bars having both flat and concave sides and adapted to be swung between the side bars to present either of said sides to position for use, and arranged to rest on said fixed cross bars when swung to present the flat sides.

4. A convertible truck having side bars, bearings in said bars, cross bars having differently shaped surfaces between said side bars, and provided with trunnions fitting in said bearings, whereby they may be swung to different positions to present either of said surfaces for use, said trunnions having heads at the outer ends adapted to prevent spreading of the side bars and means to support the cross bars in either position.

In testimony whereof, we do affix our signatures in presence of two witnesses.

CHARLES W. BROWN.
ALFRED H. BOWLZER, Jr.

Witnesses:
  JOHN A. BOMMHARDT,
  ALTON H. BEMIS.

Copies of this patent may be obtained for five cents each, by addressing the "Commissioner of Patents, Washington, D. C."